Feb. 17, 1931.   I. O. FRYE   1,793,078

EGG CRATE LID RETAINING MEANS

Filed March 22, 1928

Witness
DEBovey

Inventor
Ira O. Frye
by Bair & Freeman Attorneys

Patented Feb. 17, 1931

1,793,078

UNITED STATES PATENT OFFICE

IRA O. FRYE, OF BEACON, IOWA

EGG-CRATE LID-RETAINING MEANS

Application filed March 22, 1928. Serial No. 263,739.

The object of my invention is to provide an egg crate lid retaining means of simple, durable, and comparatively inexpensive construction.

A further object of my invention is to provide a retaining means for egg crate lids whereby the lid may be conveniently and easily held in position on the crate, the retaining means being easily operated for quick removal of the lid.

Still a further object is to provide a bail in connection with one end of the lid whereby a detachable hinge connection is provided and a clamp device at the other end whereby the hinge connection and the clamp serve to retain the lid in closed position.

With these and other objects in view my invention consists in the construction, arrangement and combination of the various parts of my device, whereby the objects contemplated are attained, as hereinafter more fully set forth, pointed out in my claims and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which.

Figure 1:
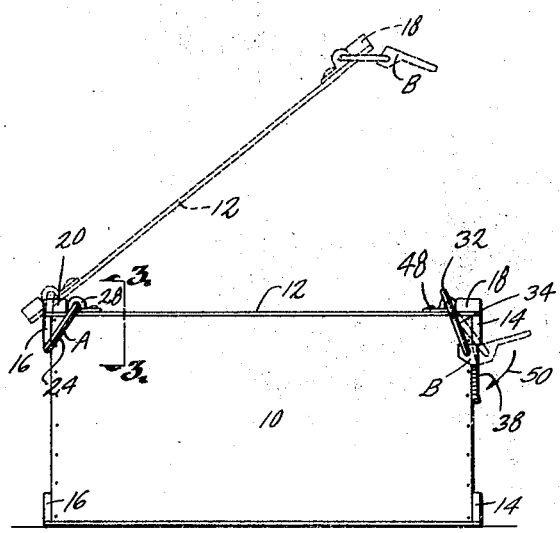
Figure 1 is a side elevation of an egg crate having the lid thereon and showing my device associated therewith for retaining the lid on the crate.
Figure 2:
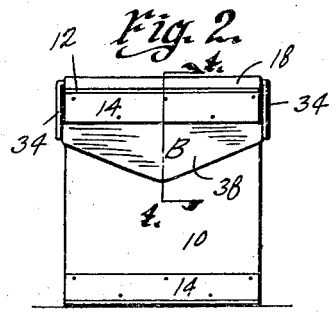
Figure 2 is an end elevation of the same.
Figure 4:
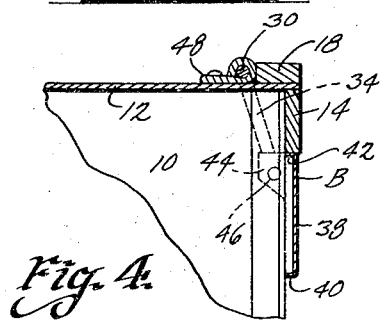
Figure 4 is an enlarged sectional view on the line 4—4 of Figure 2.

On the accompanying drawings I have used the reference numeral 10 to indicate an egg crate. The crate 10 is provided with a lid 12. Cleats 14 extend across one end of the crate 10 and cleats 16 extend across the other end thereof. At one end of the lid 12 a cleat 18 extends across it and at the other end a cleat 20 is provided. The foregoing description is of an ordinary egg crate in general use today and my invention embodies a retaining means for this particular type of crate and lid.

Adjacent the cleat 20 I provide my removable hinge means indicated generally by the reference character A and adjacent the cleat 18 I provide the clamp member indicated generally by the reference character B. The member A consists of a piece of spring wire having a portion 22 terminating in downwardly extending portions 24 and inwardly directed portions 26. A connecting member 28 is provided at the center of the portion 22 for attachment to the lid 12. The member A is in this manner pivotally connected to the member 28 and consequently to the lid 12. The clamping member B comprises a piece of spring wire having a portion 30 extending outwardly and upwardly as indicated at 32 at its ends and then bent downwardly as at 34. The downwardly bent ends 34 terminate in inwardly directed portions 36. A clamping lever 38 is pivoted to the portions 36.

The clamping lever 38 consists of a piece of sheet metal having reinforcement flanges 40 and 42. Ears 44 are formed at the ends of the lever 38. The ears 44 are provided with openings 46 through which the portions 36 of the wire extend.

*Application of my invention to an egg crate*

Figure 3:
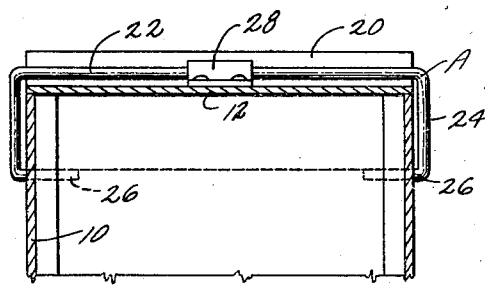
Figure 3 is an enlarged sectional view on the line 3—3 of Figure 1.
Figure 5:
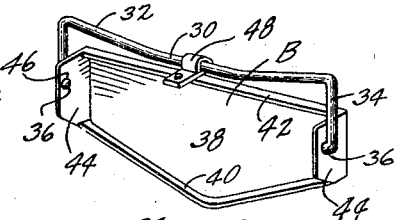
Figure 5 is a perspective view of the clamping means at one end of the lid.
Figure 6:
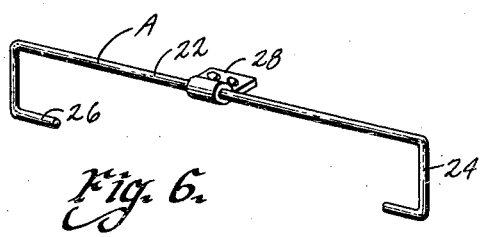
Figure 6 is a perspective view of the pivotal detachable hinge connection means at the other end of the lid.

The member A is mounted adjacent the cleat 20 by securing the plate 28 to the lid 12. The portions 26 of the member A extend underneath the cleat 16 as indicated in Figures 1 and 3 of the drawings.

The member A is secured to the lid 12 adjacent the cleat 18 thereon by a plate 48 similar to the plate 28. The flange 42 of the member B coacts with the underside of the cleat 14 when the lid is in retained position on the crate.

*Operation of my device*

In the operation of my device the portions 26 of the member A are hooked under the cleat 16 with the lid 12 in raised position as illustrated in Figure 1. The lid is then brought down to closed position and the lever 38 inserted under the cleat 14 as illustrated in dotted lines in Figure 1. The lever 38 is then swung downwardly as indicated by the arrow 50 to the full line position and in moving to this position the arms 34 of the member B swing across the pivotal connection between the lever 38 and cleat 14 which consists of the corner between the plate 38 and the flange 42 thereon. The portions 32 of the wire are bent as illustrated so that when they are in clamped position, they will be pulled downwardly and exert a spring tension to draw the lid 12 toward the crate 10.

The members 28 and 48 may be extended under the cleats 20 and 18 so that they may be secured to the lid 12 by the same nails.

Some changes such as doubling the flanges 40 and 42 back against the plate 38 and even extending them along the upper and lower edges of the ears 44 for making these ears stronger, may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A lid fastener for crates provided with cleats comprising a bail having a portion adapted to extend over said lid and other portions adapted to extend across transversely opposite upper corners of the crate and a clamping plate pivoted thereto and having an upper edge to engage beneath said cleat and a lower edge to be engaged for manipulating the plate as a clamping lever.

2. A lid fastener for crates provided with cleats comprising a bail adapted to extend over said lid and across and upper corner of the crate and a clamping plate pivoted thereto and having an upper edge to engage beneath said cleat and a lower edge to be engaged for manipulating the plate as a clamping lever, said bail being of resilient wire material and having a portion arranged crosswise of said crate which is placed under tension when said plate is in lid fastening position.

Des Moines, Iowa, March 12, 1928.

IRA O. FRYE.